United States Patent [19]
Johnson et al.

[11] Patent Number: 5,127,814
[45] Date of Patent: Jul. 7, 1992

[54] APPARATUS FOR PRODUCING A FLUID-ASSISTED INJECTION MOLDED PRODUCT

[75] Inventors: Joe L. Johnson, Middlefield; Richard T. Seman, Sr., Newbury, both of Ohio

[73] Assignee: Nitrojection Corporation, Middlefield, Ohio

[21] Appl. No.: 618,173

[22] Filed: Nov. 26, 1990

[51] Int. Cl.⁵ .............................................. B29C 45/22
[52] U.S. Cl. ........................... 425/130; 264/572; 425/564; 425/566; 425/570; 425/571
[58] Field of Search ............... 425/562, 563, 564, 565, 425/566, 568, 569, 570, 571, 574, 130, 533, 536; 264/85, 572

[56] References Cited

U.S. PATENT DOCUMENTS

| | | | |
|---|---|---|---|
| 3,820,812 | 5/1989 | Kauer | 264/572 |
| 4,474,717 | 10/1984 | Hendry | 264/572 |
| 4,555,225 | 11/1985 | Hendry | 425/127 |
| 4,740,150 | 4/1988 | Sayer | 264/572 |
| 4,938,681 | 7/1990 | Gellert | 425/562 |
| 4,990,083 | 2/1991 | Bernhardt | 264/572 |
| 5,044,924 | 9/1991 | Loren | 425/542 |

Primary Examiner—Tim Heitbrink
Attorney, Agent, or Firm—Fay, Sharpe, Beall, Fagan, Minnich & McKee

[57] ABSTRACT

An apparatus for use in gas-assisted injection molding of plastic material so as to form an injection molded product includes a pair of mold members defining, when closed, a sealed cavity. A first opening is provided in one of the mold members for allowing the injection of a plastic material into the mold cavity and a second opening is provided in one of the mold members, and spaced from the first opening. A sleeve extends through the second opening. A probe extends through the sleeve and is adapted to be reciprocated therein from a retracted position to an extended position. The probe includes a first end adapted to selectively extend into the cavity, a second end and a longitudinally extending bore which terminates adjacent the second end. A reciprocating device is provided for reciprocating the probe in the sleeve held in the second opening of the one mold member in relation to the cavity.

25 Claims, 5 Drawing Sheets

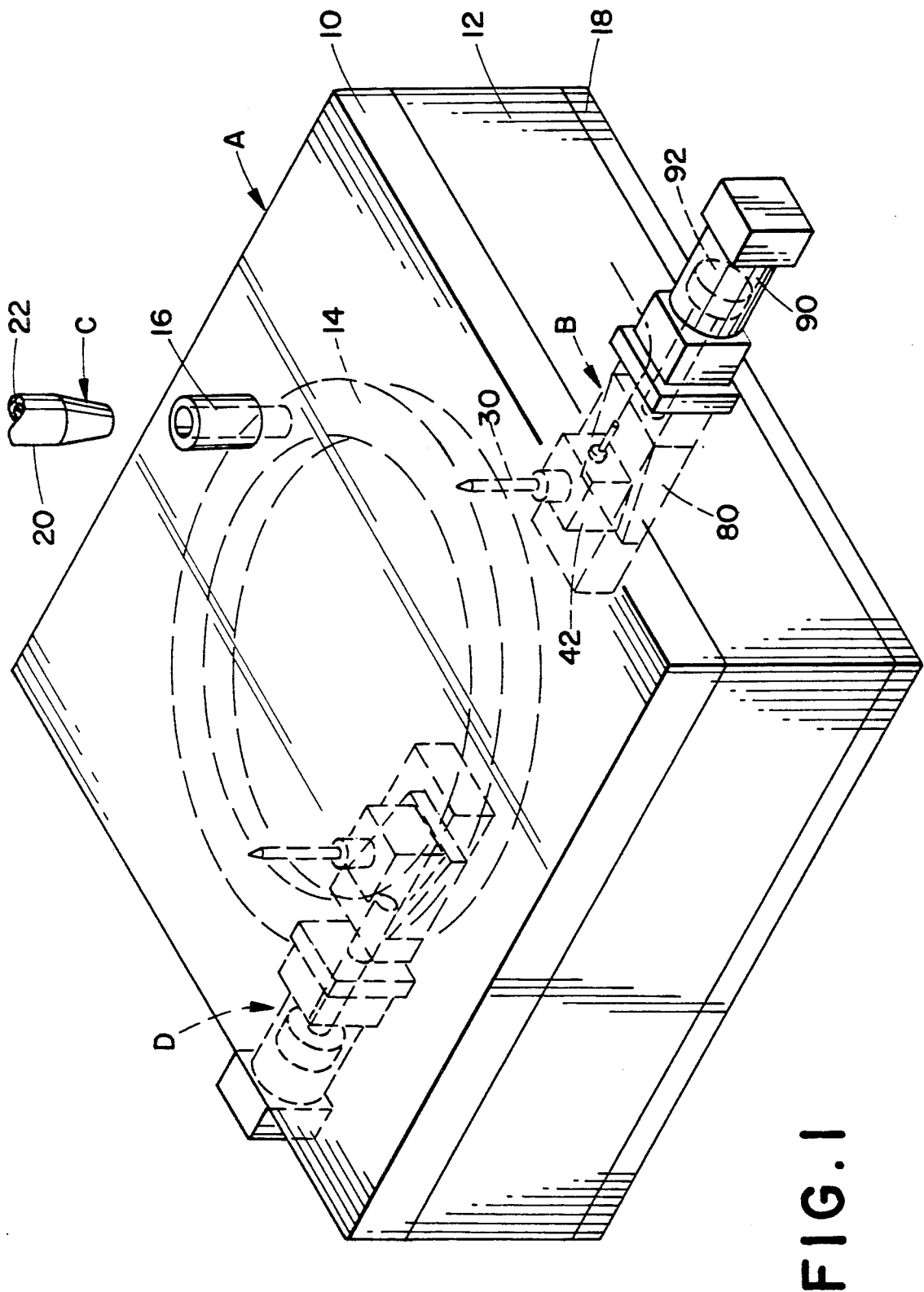

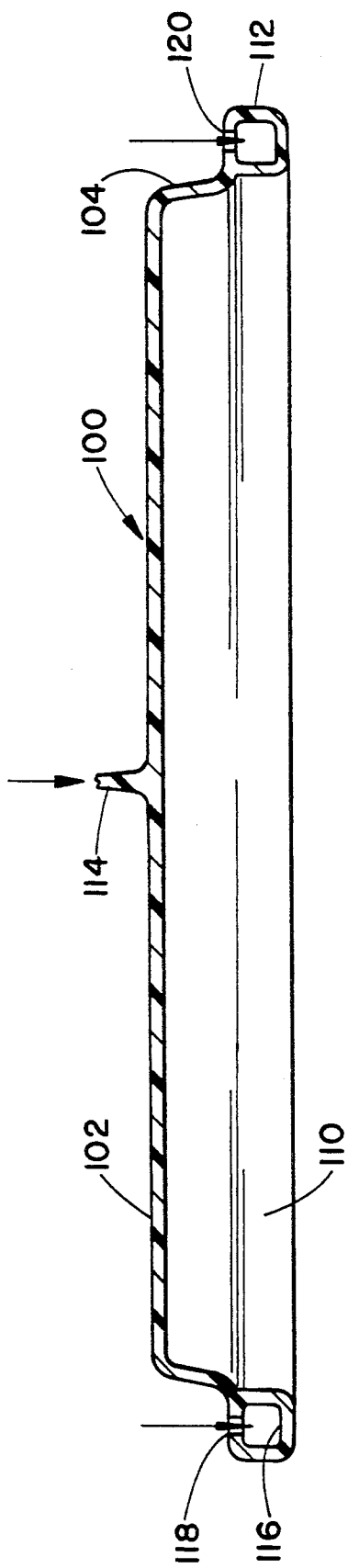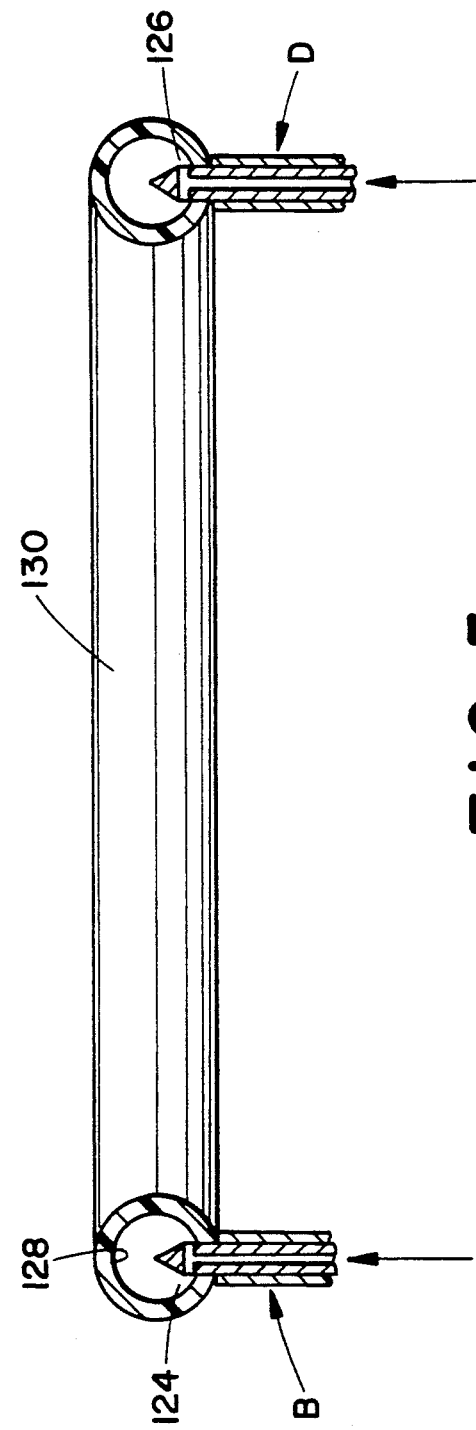

APPARATUS FOR PRODUCING A FLUID-ASSISTED INJECTION MOLDED PRODUCT

BACKGROUND OF THE INVENTION

This invention generally pertains to an injection molding apparatus. More specifically, the present invention relates to a gas injection nozzle for such an injection molding apparatus.

The invention is particularly applicable to a nozzle for the injection of a viscous fluid, such as a molten plastic, and a non-viscous fluid, such as a gas, into an injection mold during a process such as gas augmented injection molding of plastic materials. However, it will be appreciated by those skilled in the art that the invention has broader applications and may also be adapted for use in many other injection molding environments where both a relatively viscous fluid, such as a plastic or wax, and a relatively non-viscous fluid, such as a gas or liquid, are injected into a mold cavity.

Injection molding processes have been widely known, not only for the production of molded articles made of various thermoplastic resins, but also for the production of lost wax masters used in the investment casting process.

One such known process is solid injection molding which employs the steps of injecting a plasticized (melted) thermoplastic material under high pressure into a finite mold space and then cooling the material sufficiently so that it rehardens to the extent that it can retain its shape after removal from the mold. Thermoplastic materials, generally shrink during rehardening and, unfortunately, this shrinkage is exaggerated in heavier wall sections, bosses, ribs, gussets, etc. This usually results in sink marks and warpage in the molded products.

Packing the mold with more material by pressing the plastic material at a higher pressure into the mold is a common technique used to minimize such excessive shrinkage. However, packing builds internal stresses into the part and often cannot remove sink marks that are located away from the injection molding sprue or gate. Additionally, packing requires high clamp pressures between the parts of the mold body in order to prevent flashing of the plastic material.

Certain proposals have recently been made to fill the mold cavity with a plasticized thermoplastic material to a volume less than one hundred percent (100%) of the mold space and to utilize an inert gas injected under pressure into the partially plasticized material as it is cooling and rehardening to fill the rest of the volume in the mold cavity. The gas enters the part and moves along the paths of least resistance therein. Such paths are normally in areas where the thermoplastic body is thicker and has slower cooling sections, such as ribs, flow channels, chamfers, etc. In this way, with a suitably designed part, a continuous network of hollowed out sections can be provided. The material displaced by the gas from the middle of the sections moves out to fill the remainder of the mold space. This network of gas channels provides a uniform pressure distribution system throughout the mold space during part rehardening and cool down, thus minimizing internal stresses. The outer surfaces of thicker sections do not sink because gas has cored them out from the inside and gas pressure holds the plastic material up against the mold surfaces during rehardening. Sink in these sections takes place internally rather than on the exterior surfaces of the part. Since the pressure used for final filling of the part is confined to an area defined by the gas channels, the resultant force against the sections of the mold is relatively modest so that lower clamping forces on the mold are adequate.

Most of the nozzles which are adapted to inject both a viscous fluid such as a thermoplastic material and a non-viscous fluid such as a gas into a mold cavity inject both of these fluids through a common nozzle. However, for the production of some moldings, especially moldings of a complex design, it is desirable to introduce the pressurized gas or other relatively non-viscous fluid at a different location than the plastic or perhaps at several locations which are all spaced from the plastic injection point. Such a situation may arise, for example, when it is desired to employ a hot runner system or the choice of gate positions is restricted by the desire to avoid an overabundance of gas channels which need to be connected to one another so that the injection of gas at one point will enable the gas to push the plastic out against the surfaces of the mold cavity throughout the extent of the mold cavity.

Accordingly, it has been considered desirable to develop a new and improved injection molding nozzle which would overcome the foregoing difficulties and others while providing better and more advantageous overall results.

BRIEF SUMMARY OF THE INVENTION

In accordance with the present invention, a new and improved apparatus is provided for use in gas-assisted injection molding of plastic material so as to form an injection molded product.

More particularly in accordance with this aspect of the invention, the apparatus comprises a pair of mold members defining, when closed, a sealed cavity, a first opening provided in one of the mold members for allowing the injection of a plastic material into the cavity and a second opening provided in one of the mold members and spaced from the first opening, for allowing the injection of gas into the mold cavity. A sleeve extends through the second opening, for allowing the injection of gas into the mold cavity. A probe extends through the sleeve is adapted to be reciprocated therein from a retracted position to an extended position. The probe comprises a first end adapted to selectively extend into the cavity, a second end and a longitudinally extending bore which terminates adjacent the second end. The bore is used to channel the gas into the mold cavity. A means is provided for reciprocating the probe in relation to the cavity.

In accordance with another aspect of the present invention, an injection molding apparatus is provided.

More particularly in accordance with this aspect of the invention, the apparatus comprises a pair of mold members defining, when closed, a sealed cavity. A first opening is provided in one of the mold members for allowing the injection of a relatively viscous material into the cavity. A second opening is provided in one of the mold members and is spaced from the first opening. A probe is located in the second opening and is adapted to be reciprocated therein from a first, retracted, position to a second, extended, position. The probe comprises a first end which selectively extends into the cavity when the probe is in the second position, a second end and a longitudinally extending bore which terminates in a port located adjacent the first end. The bore is selectively used, when the probe is in the second position, for the injection of a relatively non-viscous fluid into the cavity and the subsequent venting of the fluid from the cavity. A sleeve extends through the second opening and encloses a portion of the probe. A means is provided for reciprocating the probe in the second opening in relation to the cavity.

According to still another aspect of the present invention an apparatus is provided for producing a fluid assisted injection molded product of a relatively viscous material such as plastic.

In accordance with this aspect of the invention, the apparatus comprises a mold space, a first passage opening into the mold space for introducing a relatively viscous material into the mold space and a second passage opening into the mold space for introducing a pressurized relatively non-viscous fluid into the relatively viscous material in the mold space so that a fluid cavity is formed in the viscous material. A probe extends through the second passage and is adapted to be reciprocated therein. The probe comprises a first end having a pointed tip adapted to pierce a skin layer of viscous material, a second end and a longitudinally extending bore through which the fluid is adapted to flow. A means is provided for supplying a pressurized relatively non-viscous fluid to the mold space through the longitudinally extending bore in the probe. A means is also provided for reciprocating the probe in the second passage so that the pressurized fluid can be selectively caused to flow into the mold space.

In accordance with yet another aspect of the invention, a process for producing an injection molded product is provided.

More particularly in accordance with this aspect of the invention, the process comprises the steps of introducing an amount of a molten relatively viscous material sufficient for the preparation of the injection molded product into a mold cavity, cooling an outer layer of the molten relatively viscous material to solidify such outer layer and piercing the solidified outer layer of the relatively viscous material. A quantity of a relatively non-viscous fluid is introduced into the mold cavity at a first location thereby forming a fluid cavity in a still molten central section of the material.

In accordance with a further aspect of the invention, a process is provided for producing an injection molded product.

More particularly in accordance with this aspect of the invention, the process comprises the step of introducing an amount of a molten relatively viscous material sufficient for the preparation of the injection molded product into a mold cavity at a first location. A relatively viscous material is then cooled to an extent such that an outer layer of the material solidifies while the interior of the material remains molten. The solidified outer layer of the material is then pierced at a second location. A quantity of a relatively non-viscous fluid is introduced into the mold cavity at the second location thereby forming a fluid cavity in the molten material.

One advantage of the present invention is the provision of a new and improved apparatus for use in injection molding.

Another advantage of the present invention is the provision of an apparatus in which a relatively viscous material, such as a plastic, is introduced at a first location and a relatively non-viscous fluid, such as a gas, is introduced at a spaced second location.

Still another advantage of the present invention is the provision of an injection molding apparatus in which a thermoplastic material or the like is introduced into a mold cavity at a first location and a gas is introduced into the mold cavity at two or more locations, both of which are spaced from the location at which the thermoplastic material is introduced.

Yet another advantage of the present invention is the provision of a gas-assisted injection molding apparatus which utilizes a probe that reciprocates so as to selectively allow a flow of gas into a mold cavity.

Still yet another advantage of the present invention is the provision of an injection molding apparatus through which gas can be circulated through the gas cavity, for example, to cool the molded product.

A further advantage of the present invention is the provision of an injection molding apparatus in which one or a number of probe elements can be provided to inject a gas or other fluid into a molten thermoplastic held in a mold cavity in order to form one continuous or a number of discontinuous fluid cavities in the product being molded.

A still further advantage of the present invention is the provision of a process for producing an injection molded product in which an outer layer of a relatively viscous material is cooled so as to solidify it while the interior of the material remains molten. Thereafter, the solidified outer layer of the material is pierced in order to introduce a quantity of relatively non-viscous fluid, such as a gas, in order to form a fluid cavity in the still molten material.

A yet further advantage of the present invention is the provision of a process for producing an injection molded product in which a quantity of a relatively non-viscous fluid is introduced, at a first location, into a relatively viscous material held in a mold cavity and is vented from the fluid cavity formed in the viscous material at a second location that is spaced from the first location.

An additional advantage of the present invention is the provision of an injection molding apparatus which eases the set up problems for the manufacturer since all of the gas injection parts are contained in the mold rather than having to be retrofitted onto the plastic injection molding machinery.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts, preferred and alternate embodiments of which will be described in detail in this specification and illustrated in the accompanying drawings which form a part hereof, and wherein:

FIG. 1 is a schematic perspective view of an injection molding apparatus according to a preferred embodiment of the present invention;

FIG. 4 is a side elevational view in cross section of an injection molded product which can be molded with the apparatus of FIG. 1;

FIG. 5 is a side elevational view in cross section of another injection molded product which can be molded with the apparatus of FIG. 1;

DETAILED DESCRIPTION OF PREFERRED AND ALTERNATE EMBODIMENTS

Figure 3:
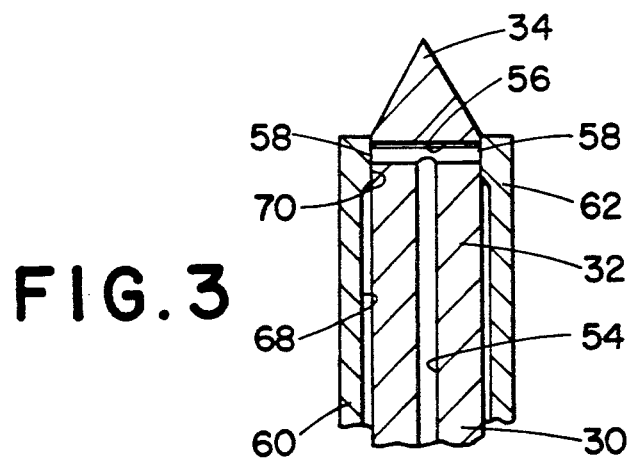
FIG. 3 is an enlarged cross sectional view through a portion of the embodiment of FIG. 2.

Referring now to the drawings, wherein the showings are for purposes of illustrating preferred and alternate embodiments of the invention only and not for purposes of limiting same, FIG. 1 shows the subject new injection molding apparatus which includes a mold body A, a first gas injection assembly B, and a plastic injection assembly C. If desired, a second gas injection assembly D can also be provided as shown in FIG. 1. While the injection molding apparatus of FIG. 1 is primarily designed for and will hereinafter be described in connection with a gas-assisted injection molding process utilizing thermoplastic material, it should be appreciated that the apparatus can also be used in various other molding environments in which a relatively viscous fluid and a relatively non-viscous fluid are injected such as for the production of lost wax masters and the like.

The apparatus preferably comprises the mold body A which includes a first mold half 10 and mating therewith a second mold half 12. As is conventionally known, the mold halves are selectively secured together by a conventional clamping assembly, not illustrated for the sake of simplicity. Defined between the mold halves 10 and 12 is a mold cavity 14. Communicating with the cavity and extending to an outer edge of the first mold half 10 is a sprue body 16. A base plate 18 is also preferably provided for the mold half 12. Adapted to selectively engage the sprue 16 is the plastic injection assembly C. This comprises a nozzle 20 which mates with the sprue body and allows a molten thermoplastic material, as at 22, to flow through the sprue body and thence into the mold cavity 14.

Figure 2:
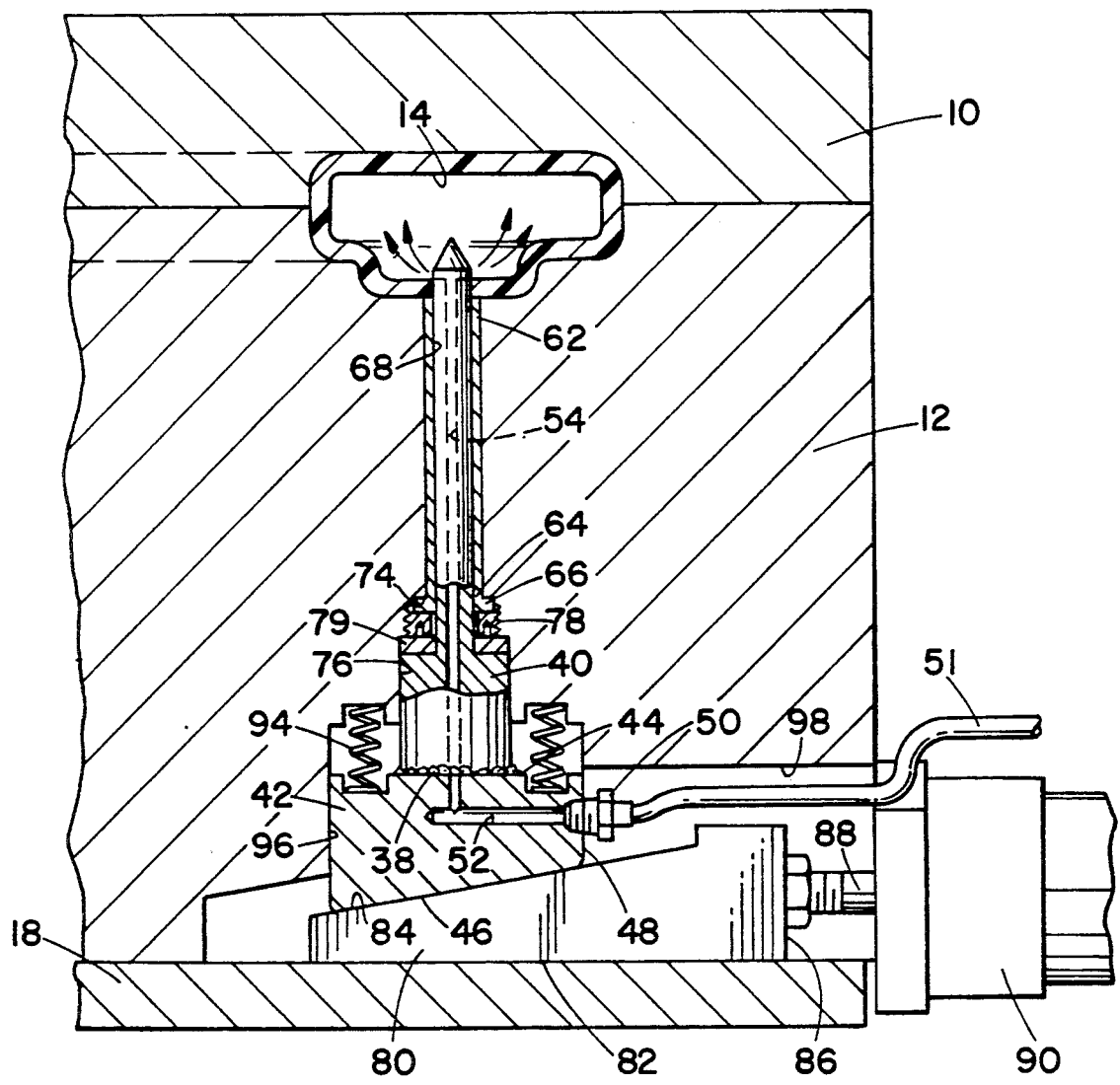
FIG. 2 is an enlarged side elevational view of a probe adapted to be reciprocated in a portion of a mold body of FIG. 1.

Extending in the second mold half 12 is a probe or pin 30 of the gas injection assembly. While two such gas injection assemblies B and D are illustrated in FIG. 1, only gas injection assembly B will be described in detail in this specification, it being appreciated that gas injection assembly D has the identical components. With reference now also to FIG. 3, the pin 30 has a first end 32 on which is located a pointed tip portion 34. As shown in FIG. 2, the pin 30 is secured, as at weld joint 38, at an enlarged diameter second end or stem 40 to a first wedge block 42. The first wedge block has a horizontal upper surface 44, to which the pin second end 40 is secured, and an angled bottom surface 46. Provided on a side wall 48 of the wedge block 42 is a fitting 50 which communicates with a suitable relatively non-viscous fluid line, such as a gas line 51, and with a block bore 52 that extends within the block 42 from the side wall to its horizontal upper surface 44. The bore 52 communicates with a pin bore 54 that extends longitudinally through the pin 30 from its second end 40 to adjacent its upper end 32. The bore 54 terminates in a cross bore 56 which extends to a pair of ports 58 on the exterior periphery of the pin. Enclosing a portion of the pin 30 is a sleeve 60 having an upper end 62 and a lower end 64 on which is provided a flange 66. A longitudinally oriented bore 68 through the sleeve 60 accommodates the pin 30.

With reference now again to FIG. 3, it can be seen that adjacent the upper end 62 of the sleeve 60 the bore 68 has a reduced diameter section 70 that serves as a seal means to prevent the flow of fluid into and out of the ports 58 when the ports are blocked by the sleeve upper end 62 as shown in FIG. 3. The section 70 is provided with a suitable known low friction coating material to ease the reciprocating motion of the pin 30 in the bore of the sleeve. For example, the section 70 can have a diameter on the order of 15 thousandths of an inch smaller than the bore 68, and may have a nitrided wear surface for resistance to abrasion. Due to the cooperation of the sleeve flange 66 with a shoulder 74 of a cavity 76 formed in the mold half 12 which accommodates the pin second end 40, the sleeve does not move upwardly as the pin enters the mold cavity to expose the ports 58, as shown in FIG. 2.

In order to prevent the sleeve 60 from sliding down in the cavity 76, a cored through set screw or spanner nut 78 is threaded into a suitably threaded section of the cavity 76. As is evident, when the set screw or nut 78 is removed, the sleeve can be slid out of the mold half cavity 76. If desired, a suitable spacer 79 can be provided between the sleeve flange 66 and the enlarged second diameter second end 40 of the pin 30. The spacer may not be necessary if the pin and sleeve are correctly sized. However, it may be advantageous to provide pins of different lengths and utilize a single length sleeve by using spacers of different sizes.

In order to allow such a reciprocating motion of the pin 30, a second wedge block 80 cooperates with the first wedge block 42. The second wedge block has a horizontal lower surface 82, that is slidably supported on the base plate 18, and an angled upper surface 84 which contacts the angled upper surface 46 of the wedge block 42. Suitably secured to an end surface 86 of the second wedge block 80 is a piston rod 88 which extends into a cylinder assembly 90. As shown in FIG. 1, a piston 92 located inside the cylinder is suitably moved by a pressurized fluid thereby actuating the piston rod 88 and pushing or pulling the wedge block 80 in relation to the wedge block 42. Such a horizontal movement of the wedge block 80 will translate into a vertical movement of the pin 30. The stroke of the piston 90 can be on the order of one inch. With a 10° angle between the blocks, this translates to a vertical movement of 170 thousands of an inch by the pin 30. For a 20° angle between the blocks, the reciprocating movement of the pin 30 would be 340 thousandths.

In order to bias the wedge block 42 away from the mold cavity 14, one or more springs 94 can be provided in an enlarged section 96 of the cavity 76. Therefore, absent pressure from the second wedge block 80 to urge the first wedge block 42 upwardly, the springs 94 will urge the first wedge block, and hence the pin 30 downwardly. Accommodating the second wedge block 80 in the mold body second half 12 is a suitable slot 98 which communicates with the enlarged section 96 of the cavity 76. While a particular means of reciprocating the pin 30 is illustrated in FIGS. 1-3, it should be appreciated that many other such means can also be successfully utilized. For example, the pin 30 could be mounted directly on the piston rod 88.

With reference now to FIG. 4, one product which can be advantageously produced with the injection molding apparatus disclosed in FIGS. 1-3 is an office machine housing component 100. This object includes a first end wall 102 and a plurality of side walls 104. An opening 110 is provided opposite the first end wall 102. In order to reinforce the housing component, a hollow annular rib 112 is provided adjacent the opening 110.

For this type of product, the molten thermoplastic used to make the product can enter at a sprue 114 along the housing component first end wall 102 whereas the gas used to form a preferably annular gas channel 116 in the rib 112 can enter through at least a first entry point 118 adjacent the rib. In the embodiment illustrated, two such entry points 118 and 120 are shown. The gas is necessary to back fill the side walls 104 of the housing component. For this type of object, the provision of separate entry points for the plastic and the gas is imperative since the thermoplastic enters the mold cavity so as to first form the first end wall 102 whereas the gas is only utilized for creating the gas channel 116 in the rib 112. Absent the entry of the gas at point 118, and if desired at point 120, most of the molten thermoplastic would pool in the rib reinforcing section 112 of the mold cavity thereby not filling out the side walls 104 of the housing component. Therefore, to form this type of product by gas-assisted injection molding it is advantageous to have spaced entry points into the mold cavity for the molten thermoplastic and the gas. The holes left at points 118 and 120 can be filled with plugs of spin welded plastic or the like.

With reference now to FIG. 5, one advantage of the provision of two separate probes such as illustrated in FIG. 1 at B and D is the opportunity to use one as a gas entry port as at 124 while the other one is used as a gas exit port as at 126 in FIG. 5. In this way, while a gas channel 128 is formed in a hollow ring-shaped product 130, through the use of the gas-in port 124, gas can be cycled through the product 130 through gas out port 126 in order to more quickly cool the product.

It should be evident that the plastic and gas can be introduced either simultaneously or the gas can be introduced after the plastic has already been injected into the mold cavity. For example, the office machine panel of FIG. 4 can be produced by injecting the thermoplastic, and 2 to 3 seconds later injecting the gas. The gas pressure can then be held for 60 to 70 seconds and is subsequently vented through the gas entry ports.

Preferably, the gas is pressurized only after the pin 30 moves up in the sleeve 60 so as to expose the ports 58 thereof. Molten thermoplastic is prevented from flowing into the ports only to the extent that the ports 58 are relatively small making it difficult for the molten thermoplastic to enter. Even so, some molten thermoplastic may enter. However, since the ports 58 are in the relatively hot central portion of the molten thermoplastic mass, the thermoplastic will stay molten in the cross bore 56 and even in the bore 54. Almost simultaneously with the extension of the pin up into the mold cavity 14 so as to expose the ports 58, the pressurized gas is injected and such gas will blow any molten thermoplastic in the bores 54 and 56 back out through the ports 58 and into the mold cavity in order to cleanse such ports. It is noted that the thermoplastic remains molten in the pin bores to allow such a result to take place.

The pin 30 stays up in the mold cavity 14 during the cooling down phase of the mold body, i.e. the time during which the gas pressure is held in the mold cavity 14. Subsequently, the gas is vented back through the gas entry ports 58, the cross port 56, the bore 54 and back through the bore 52 and the gas line 51. The inflow and outflow of gas are regulated by suitable known valves which are not illustrated for the sake of simplicity. Preferably there is a controlled venting of the gas flowing out through the line 51 as this has been found to be advantageous.

One of the advantages of utilizing the pointed pin or probe 30 is that its tip can be used to pierce a solidified outer skin of thermoplastic material held in a mold cavity to ensure that the gas flows into the still molten middle of the thermoplastic material held in the mold cavity. In other words, the relatively viscous material of the molten thermoplastic will cool to an extent such that its outer layer solidifies while its interior remains in a molten state, for example during the 2 to 3 seconds mentioned above. This will happen naturally since the thermoplastic is injected at a higher temperature than the temperature at which the mold body is held. Therefore, the molten thermoplastic will cool once it contacts the walls of the mold cavity. The longer the thermoplastic resides in the mold cavity before the injection of the gas, the more of the thermoplastic will cool to a relatively solid state. However, once the pointed tip pierces the solidified layer and the gas, or other relatively non-viscous fluid, is introduced, it will create a gas cavity within the still molten center of the thermoplastic material thereby urging the still molten thermoplastic material out against the walls of the mold cavity.

Another advantage of the ability to circulate fluids through the product as illustrated in FIG. 5, is that one could utilize a first type of fluid, such as a gas, to make the cavity 128 and then use a different type of fluid, e.g. water or another type of fluid that has good heat transfer characteristics, in order to cool the part faster.

Figure 6:
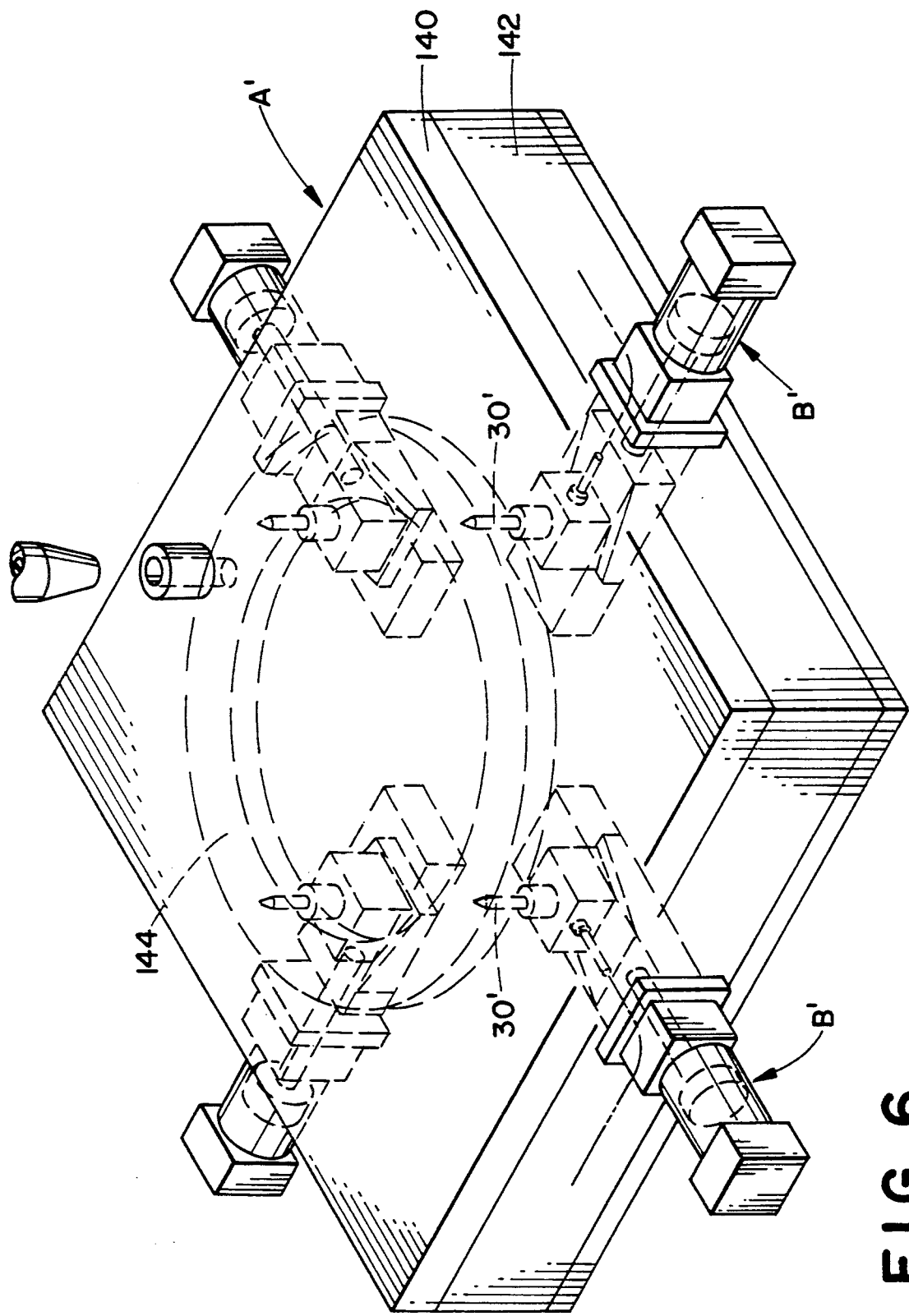
FIG. 6 is a schematic perspective view of an injection molding apparatus according to a first alternate embodiment of the present invention; and, FIG. 7 is a schematic perspective view of an injection molding apparatus according to a second alternate embodiment of the present invention.

With reference now to FIG. 6, an alternate embodiment of a gas-assisted injection molding apparatus is there illustrated. For ease of comprehension and appreciation of this alternative, like components will be identified by like numerals with a primed suffix (') and new components will be identified by new numerals.

In this embodiment a mold body A' includes first and second mold halves 140 and 142 which together define between them a mold cavity 144. Selectively extending into the mold cavity 144 are a plurality of pins 30' of gas assembly B'. In this embodiment, four such pins are illustrated as being located spaced at 90° intervals from each other. The provision of such a large number of pins would be advantageous in a situation where a number of discontinuous gas cavities need to be formed in the thermoplastic material. Such discontinuous gas cavities may be necessary in a situation where a particularly complex type of injection molded product is created.

While the pins 30' are illustrated as being located in the second mold half 142, it should be appreciated that they could also be located in the first mold half 140 if desired and if the thickness of the mold half 140 were suitably increased in order to accommodate the gas injection assemblies B'. Alternatively, one or more of the pins could be located in one mold half while the rest of the pins are located in the second mold half.

It should also be evident that providing a large number of separate pins will enable one to selectively circulate a cooling gas or other fluid through any desired portion of the injection molded product in order to more quickly cool the product and thus allow a more prompt separation of the mold halves so as to enable removal of the product from the mold cavity.

Figure 7:
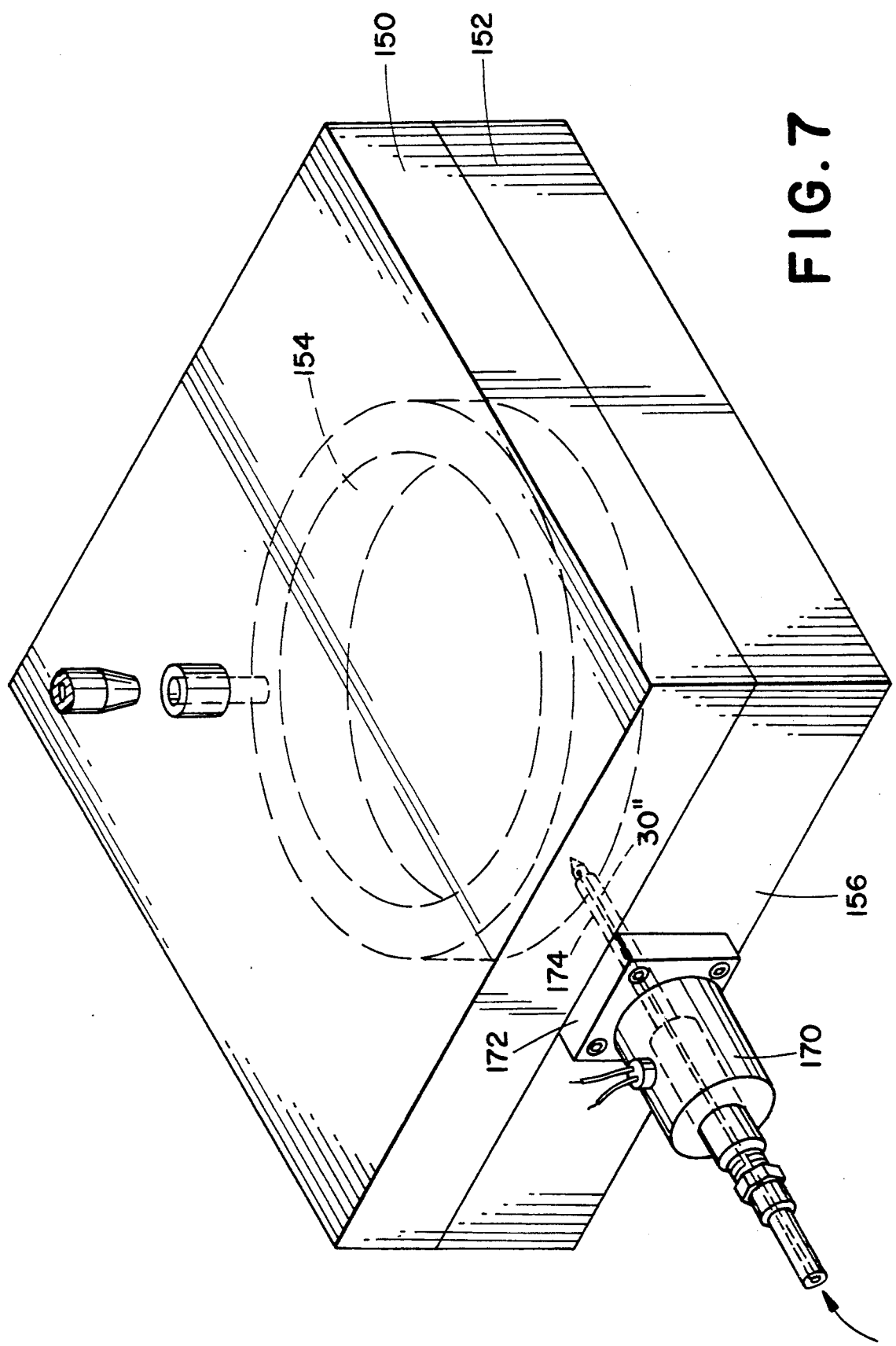

With reference now to FIG. 7, a second alternate embodiment of the gas-assisted injection molding apparatus is there illustrated. For ease of comprehension and appreciation of this alternative, like components will be identified by like numerals with a double primed suffix (") and new components will be identified by new numerals.

As illustrated in FIG. 7, a mold includes first and second mold halves 150 and 152 which define between them a mold cavity 154. Extending into the mold cavity from a side surface 156 of one of the two mold halves is a pin 30" which can be identical to the pins previously described. However, in this embodiment the pin, rather than extending into the mold cavity 154 from either above or below, extends into the mold cavity from on end. This may be advantageous for the injection molding of certain types of product. In other words, the gas can be injected from the pins either parallel to or perpendicular the line of draw of the injection molded part. While FIGS. 1 and 6 illustrate pins that are in line to the draw of the mold, FIG. 7 illustrates a pin that is perpendicular to the line of draw of the mold.

In this embodiment, a different means of reciprocating the pin 30' is also disclosed. This means comprises a conventional push pull solenoid 170 which is fastened by a plate 172 to the mold half 152. A suitable bore 174 in the mold half 152 allows the pin 30 to reciprocate in relation to the mold cavity 154. Thus it is evident that different means for reciprocating the pins 30, 30' and 30" can be provided. The solenoid construction can include a spring (not illustrated) if desired to bias the pin 30" away from the mold cavity The invention has been described with reference to preferred and alternate embodiments. Obviously, modifications and alterations will occur to others upon the reading and understanding of this specification. It is intended to include all such modifications and alterations insofar as they come within the scope of the appended claims or the equivalents thereof.

Having thus described the preferred embodiments, the invention is claimed as follows:

1. An apparatus for use in gas-assisted injection molding of plastic material so as to form an injection molded product, the apparatus comprising:
   a pair of mold members defining, when closed, a sealed cavity;
   a first opening provided in one of said mold members for allowing injection of a plastic material into said cavity;
   a second opening provided in one of said mold members, and spaced from said first opening, for allowing injection of gas into said cavity;
   a sleeve rigidly secured in one of said mold members and extending through said second opening, said sleeve having an open first end;
   a probe extending through said sleeve and adapted to be reciprocated therein from a retracted position to an extended position, said probe comprising:
   a first end, adapted to selectively extend into said cavity and past said sleeve open first end,
   a second end, and
   a longitudinally extending bore which terminates in a port adjacent said probe first end, said bore being used to channel the gas into said cavity when said probe first end extends into said cavity, wherein said port is then located past said sleeve first end; and,
   a means for reciprocating said probe in relation to said cavity.

2. The apparatus of claim 1 wherein said probe first and terminates in a pointed tip which is adapted to pierce a layer of said plastic material held in said cavity.

3. The apparatus of claim 1 wherein said means for reciprocating comprises:
   a trapezoidal base member on which said probe is mounted;
   a trapezoidal slidable member on which said base member is supported wherein said base member and said slidable member meet along a plane angled to the horizontal such that a horizontal movement of said slidable member translates into a vertical movement of said base member, and hence said probe; and,
   a means for selectively moving said slidable member in a horizontal direction thereby moving said base member in a vertical direction.

4. The apparatus of claim 1 wherein said sleeve first end is so positioned in relation to one of said mold members as to be even with a mold cavity wall of said one of said mold members.

5. An injection molding apparatus comprising:
   a pair of mold members defining, when closed, a sealed cavity;
   a first opening provided in one of said mold members for allowing injection of a viscous material into said cavity;
   a second opening provided in one of said mold members, and spaced from said first opening;
   a probe located in said second opening and adapted to be reciprocated therein from a first retracted position to a second extended position, said probe comprising:
   a first end, which selectively extends into said cavity when said probe is in said second position,
   a second end, and
   a longitudinally extending bore which terminates in a port adjacent said first end, said bore being selectively used, when said probe is in said second position, for injection of a non-viscous fluid into said cavity and subsequent venting of the fluid from the cavity;
   a sleeve extending through said second opening and enclosing a portion of said probe, said sleeve being rigidly secured to one of said mold members and including a first end which is located at said sealed cavity; and,
   a means for reciprocating said probe in said second opening in relation to said sleeve such that when said probe is in said second position said port extends past said sleeve first end and is located in said cavity.

6. The apparatus of claim 5 wherein said probe first end terminates in a pointed tip which juts into said cavity when said probe is in said second position.

7. The apparatus of claim 5 wherein said means for reciprocating comprises:
   a base member on which said probe is mounted;
   a slidable member on which said base member is supported wherein said base member and said slidable member meet along an angled plane such that a horizontal movement of said slidable member translates to a vertical movement of said base member, and hence said probe; and, means for selectively moving said slidable member.

8. The apparatus of claim 7 wherein said means for selectively moving comprises a piston and cylinder arrangement wherein a piston rod extending from said cylinder is secured to said slidable member.

9. The apparatus of claim 7 further comprising a biasing means for urging said probe away from said cavity, said biasing means being located between said base member and a section of said one mold half.

10. The apparatus of claim 9 wherein said biasing means comprises at least one compression spring.

11. The apparatus of claim 5 further comprising:
a third opening provided in one of said mold members, and spaced from said first and second openings;
a second sleeve secured in said third opening;
a second probe extending through said second sleeve and adapted to be reciprocated therein, said second probe comprising:
a first end, adapted to selectively extend into said cavity,
a second end, and
a longitudinally extending bore which terminates adjacent said second end, said bore being selectively used for flow of an additional nonviscous fluid into said cavity; and,
a means for reciprocating said second probe in said third opening in relation to said second sleeve.

12. The apparatus of claim 5 wherein said sleeve first end closely encircles said probe first end to prevent said fluid from flowing therepast when in said first retracted position.

13. The apparatus of claim 5 wherein said sleeve includes a second end which is provided with a flange having a larger diameter than a diameter of a bore in said one mold half through which said probe extends.

14. The apparatus of claim 5 wherein said sleeve first end is so positioned in relation to one of said mold members as to be even with a mold cavity wall of said one of said mold members.

15. An apparatus for providing a fluid-assisted injection molded product of a viscous material, the apparatus comprising:
a pair of mold member forming, when closed, a mold space;
a first passage opening into said mold space for introducing said viscous material into said mold space;
a second passage opening into said mold space, and spaced from said first passage, for introducing a pressurized non-viscous fluid into the viscous material in said mold space so that a fluid cavity is formed in the viscous material;
a probe extending into said second passage and adapted to be reciprocated therein, said probe comprising:
a first end having a pointed tip adapted to pierce a cooled skin layer of the viscous material,
a second end, and
a longitudinally extending bore through which the non-viscous fluid is adapted to flow;
a means for supplying the pressurized non-viscous fluid to said one mold space through said longitudinally extending bore in said probe; and,
a means for reciprocating said probe in relation to said second passage so that the pressurized fluid can selectively flow into said mold space wherein said means for reciprocating comprises:
a base member on which said probe is mounted,
a slidable member on which said base member is supported, and
a means for selectively moving said slidable member wherein said base member and said slidable member meet along an angled plane such that a horizontal movement of said slidable member translates to a vertical movement of said base member, and hence said probe.

16. The apparatus of claim 15 further comprising a biasing means for urging said probe away from said fluid cavity, said biasing means being located between said base member and one of said mold members.

17. The apparatus of claim 16 wherein said biasing means comprises at least one compression spring.

18. The apparatus of claim 15 further comprising a sleeve enclosing a portion of said probe, said sleeve having a first end and a second end, wherein said sleeve second end is provided with a flange having a larger diameter than a diameter of said second passage, so that said sleeve does not reciprocate in said second passage when said probe reciprocates.

19. The apparatus of claim 18 further comprising a means for preventing flow of the viscous material between said probe and said sleeve.

20. An apparatus for use in fluid-assisted injection molding of plastic material so as to form an injection molded product, the apparatus comprising:
a pair of mold members defining, when closed, a sealed cavity;
a first opening provided in one of said mold members for allowing injection of a plastic material into said cavity;
a second opening provided in one of said mold members, and spaced from said first opening, for allowing injection of a fluid into said cavity;
a sleeve extending through said second opening, said sleeve having a longitudinally extending bore with an open first end and an open second end;
a means for rigidly securing said sleeve to said one of said mold members;
a probe extending through said sleeve and adapted to be reciprocated therein from a retracted position to an extended position, said probe comprising:
a first end, adapted to selectively extend into said cavity,
a second end, and
a longitudinally extending bore which terminates adjacent said second end, said bore being used to channel the fluid into said cavity; and,
a means for reciprocating said probe in said sleeve such that, in an extended position, said probe first end extends past said sleeve first end.

21. The apparatus of claim 20 wherein said means for rigidly securing comprises:
a flange located on said sleeve second end; and,
a fastener for securing said flange to said one of said mold members.

22. The apparatus of claim 21 wherein one of said mold members includes a cavity in which said flange is positioned.

23. The apparatus of claim 20 wherein said bore in said probe terminates in a port adjacent said probe first end, said port being positioned in said cavity, past said sleeve first end, when said probe is in said extended position.

24. The apparatus of claim 20 wherein said bore in said probe terminates in a pair of spaced, side-facing ports located adjacent said probe first end.

25. The apparatus of claim 24 wherein said sleeve seals against said probe when said probe is in a retracted position so that said ports are prevented from communicating with said sealed cavity.

* * * * *